United States Patent
Richardson

(10) Patent No.: US 7,808,697 B2
(45) Date of Patent: Oct. 5, 2010

(54) TIR LIGHT VALVE

(76) Inventor: Brian Edward Richardson, 18675-P Adams Ct., Morgan Hill, CA (US) 95037

( * ) Notice: Subject to any disclaimer, the term of this patent is extended or adjusted under 35 U.S.C. 154(b) by 0 days.

(21) Appl. No.: 12/319,173

(22) Filed: Jan. 2, 2009

(65) Prior Publication Data
US 2009/0116099 A1 May 7, 2009

Related U.S. Application Data

(63) Continuation of application No. 11/298,768, filed on Dec. 9, 2005, now Pat. No. 7,499,206.

(51) Int. Cl.
*G02B 1/29* (2006.01)
(52) U.S. Cl. ............... 359/320; 359/529; 372/12
(58) Field of Classification Search ........... 359/237, 359/154, 155, 227, 529; 372/12, 99
See application file for complete search history.

(56) References Cited

U.S. PATENT DOCUMENTS

| | | | |
|---|---|---|---|
| 223,898 A | 1/1880 | Edison | |
| 2,971,083 A | 2/1961 | Phillips et al. | |
| 4,566,935 A | 1/1986 | Hornbeck | |
| 4,596,992 A | 6/1986 | Hornbeck | |
| 4,615,595 A | 10/1986 | Hornbeck | |
| 4,662,746 A | 5/1987 | Hornbeck | |
| 4,710,732 A | 12/1987 | Hornbeck | |
| 4,956,619 A | 9/1990 | Hornbeck | |
| 5,028,939 A | 7/1991 | Hornbeck et al. | |
| 5,319,491 A | 6/1994 | Selbrede | |
| 5,396,350 A | 3/1995 | Beeson | |
| 5,467,208 A | 11/1995 | Kokawa et al. | |
| 6,040,937 A | 3/2000 | Miles | |
| 6,350,041 B1 | 2/2002 | Tarsa | |
| 6,360,033 B1 * | 3/2002 | Lee et al. ............ 385/18 |
| 6,421,103 B2 | 7/2002 | Yamaguchi | |
| 6,438,283 B1 * | 8/2002 | Karaguleff et al. ........ 385/18 |
| 6,674,562 B1 | 1/2004 | Miles | |
| 6,768,572 B2 * | 7/2004 | Romanovsky ............ 359/245 |
| 6,867,896 B2 | 3/2005 | Miles | |
| 7,080,932 B2 | 7/2006 | Keuper | |
| 7,123,216 B1 | 10/2006 | Miles | |
| 7,142,744 B2 * | 11/2006 | Walter et al. ............ 385/18 |
| 7,286,296 B2 | 10/2007 | Chaves et al. | |
| 7,345,824 B2 | 3/2008 | Lubart | |
| 7,447,397 B1 * | 11/2008 | Maki et al. ............ 385/17 |
| 2002/0044720 A1 * | 4/2002 | Brophy et al. ............ 385/17 |
| 2005/0248827 A1 | 11/2005 | Starkweather et al. | |
| 2006/0070379 A1 | 4/2006 | Starkweather et al. | |

FOREIGN PATENT DOCUMENTS

JP 02002229017 A 8/2002

* cited by examiner

*Primary Examiner*—Timothy J Thompson
(74) *Attorney, Agent, or Firm*—Carr & Ferrell LLP

(57) ABSTRACT

An array of light valves switch light by enabling and disabling total internal reflection (TIR) on a surface of the light valve. The disabling of the TIR is accomplished by putting another optical element in contact with the surface and then diffusing or changing the direction of the light. The mechanical mechanism to move the optical element is a simple one in that it only moves the optical element a small distance to change the valve from a first position to a second position.

39 Claims, 10 Drawing Sheets

TIR LIGHT VALVE

This application is a continuation of U. S. patent application Ser. No. 11/298,768, filed Dec. 9, 2005, now issued as U.S. Pat. No. 7,499,206.

FIELD OF THE INVENTION

This invention relates generally to light switching means, and more particularly, is a means of switching of light by enabling and disabling total internal reflection, TIR.

BACKGROUND OF THE INVENTION

Many fields require the switching of light to accomplish their task. One major application for the switching of light is in the field of computer data projection and television projection systems. Currently these products use either LCDs or MEMS mirror arrays to accomplish the task of switching light.

Another major industry that uses light switching technology is the communications market. In the communications field, switches are used to control light transmission to and from fiber optic cables.

Light valves are being used in more and more TVs and projection display systems. In TV applications the projector is often used in a rear projection configuration. For computer monitors using projection display, the front projection mode is more commonly used.

The MEMS mirror array type of light valve is disclosed in U.S. Pat. Nos. 4,566,935; 4,596,992; 4,615,595; 4,662,746; 4,710,732; 4,956,619; and 5,028,939; all by inventor Larry Hornbeck of Texas, and assigned to Texas Instruments (TI) of Texas. The TI patents are the foundation of the technology that is used by most manufacturers of TVs and computer projection displays. The TI technology uses an array of MEMS mirrors that change their incidence angle to the light path to move the light switch from a first position to a second position. When the mirror is in the first position, the mirror reflects the light through the optical path. When the mirror is in the second position, the light is reflected to a path that falls outside the projection optics. This in effect turns the light valve to an off state.

There are many deficiencies with this technology. One is that the light transmission is less than 70%. To allow for the change of angular orientation of the mirrors, there must be a substantial space between adjacent mirrors. The required gap causes a lot of light to be wasted. Further, the reflected light is absorbed into the light valve. The absorbed energy makes cooling switching devices that use this technology a challenge.

Further, the high amount of absorption limits the amount of power that can be pushed through the light valve. This limitation either eliminates this type of device from being used in high power applications, or causes the necessity of a complex cooling solution.

Another shortcoming of devices using the TI technology is that the MEMS structure to create mirrors that can rotate is a complex one to manufacture.

Still another shortcoming in this technology is that the angle of deflection of the light is not precise. In some applications this lack of control over the angle to which the light is transmitted causes a further reduction of transmission efficiency.

Another popular technology for use in projection applications is LCD technology. However, LCDs are not efficient for the transmission of light. LCDs are slow in response time and do not work well at elevated temperatures. Because of their thermal limitations, the size of the LCDs must be much greater in size than competing technology devices.

Accordingly, it is an object of the present invention to provide a light valve with greatly improved efficiency.

It is another object of the present invention to provide a less complex light valve structure thereby making possible lower cost switching systems.

It is a further object to provide a light valve that reflects almost 100% of the light received, thereby enabling systems to run at extremely high powers while requiring less elaborate cooling systems than are required by current art systems.

It is a still further object of the invention to provide a light valve that can switch faster. This is because there is only a small movement in the MEMs elements during the switching.

It is yet another object of the present invention to provide a higher contrast ratio of the first state to the second state of the light valve.

It is a further object of the invention to provide a light valve that enables light to be accurately switched to two paths.

SUMMARY OF THE INVENTION

The present invention is a light valve for use in projectors and telecommunication switching equipment. The light valve switches light from a first controlled optical path to either a diffused path or to a second controlled optical path. The diffused path effectively eliminates any light from continuing through the original first controlled optical path. The light switch directs light to the second controlled optical path in a controlled manner with high efficiency. The light that travels through the first (not switched) controlled path does so with high efficiency. The efficiency of the light transmission is obtained by internal reflection at the interface between two elements with different optical indexes of refraction.

An advantage of the light valve structure of the present invention is that the light valve reflects almost 100% of the light received, thereby enabling systems utilizing the switch to run at extremely high powers while requiring less elaborate cooling systems than are required by current art systems.

Another advantage of the present invention is that it provides a less complex light valve structure thereby making possible lower cost switching systems.

Still another advantage of the present invention is that the light valve can switch faster. This is because only a small movement in the MEMs elements is required.

These and other objectives and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
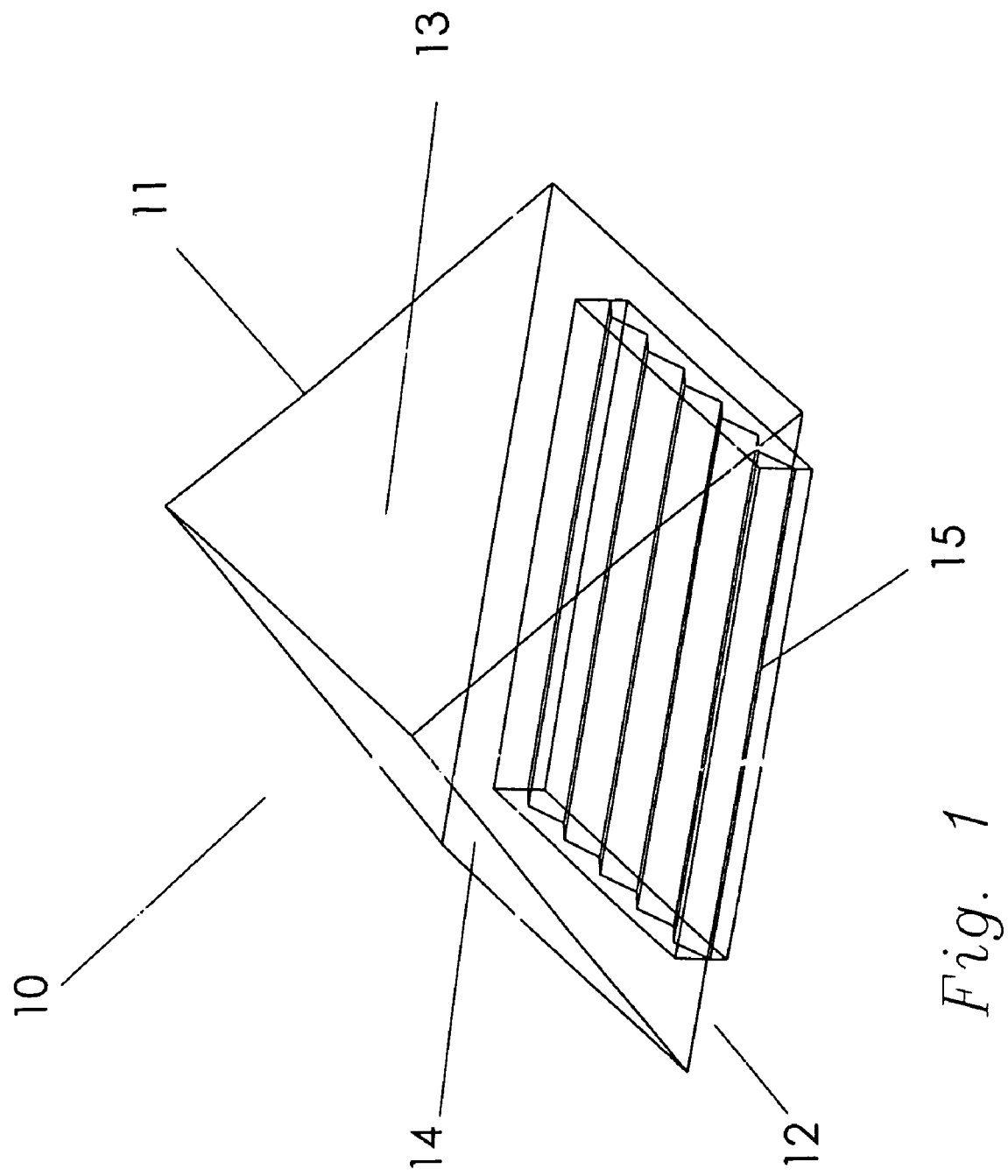
FIG. 1 shows a perspective view of the light valve of the present invention.

Referring first to FIG. 1, the light valve 10 of the present invention comprises a prism 11. The prism 11 has three optical surfaces; the hypotenuse surface 12, the input optical surface 13, and the output optical surface 14. The input surface 13 is where light rays (not shown in FIG. 1) enter the light valve 10. A switch element 15 is located in close proximity to the hypotenuse surface 12 of the prism 11.

Light is projected onto the input optical surface 13 of the prism 11. The light source can be chosen from many systems of lenses, reflectors, and/or lamps. The light source can be one of many types, including arc lights and LEDs. The collection of the light from the light source is accomplished with a lens or reflector or any combination thereof. One skilled in the art of light sources and the collection of light can easily construct many systems to efficiently collect and direct light toward the light valve.

In the case of a telecommunications system, the light source may be a fiber optic cable or a laser. The light might be parallel, converging, or divergent. (The orientation of the light rays is more a requirement of the light source collection optics and the projection optics in the case of a projector system. In the case of a telecommunications system, light orientation would be more of a function of the associated devices and not the light valve.)

In the case of a projection system, a color wheel might be deployed between the light source and the light valve. The color wheel rotates faster than a human eye can detect. The light valve is synchronized with the colors of the wheel so that a color projection can be created. A single color filter may also be used in the case where there is one light valve for each color. Projection systems typically have three valves, one for each of the primary colors.

Figure 2:
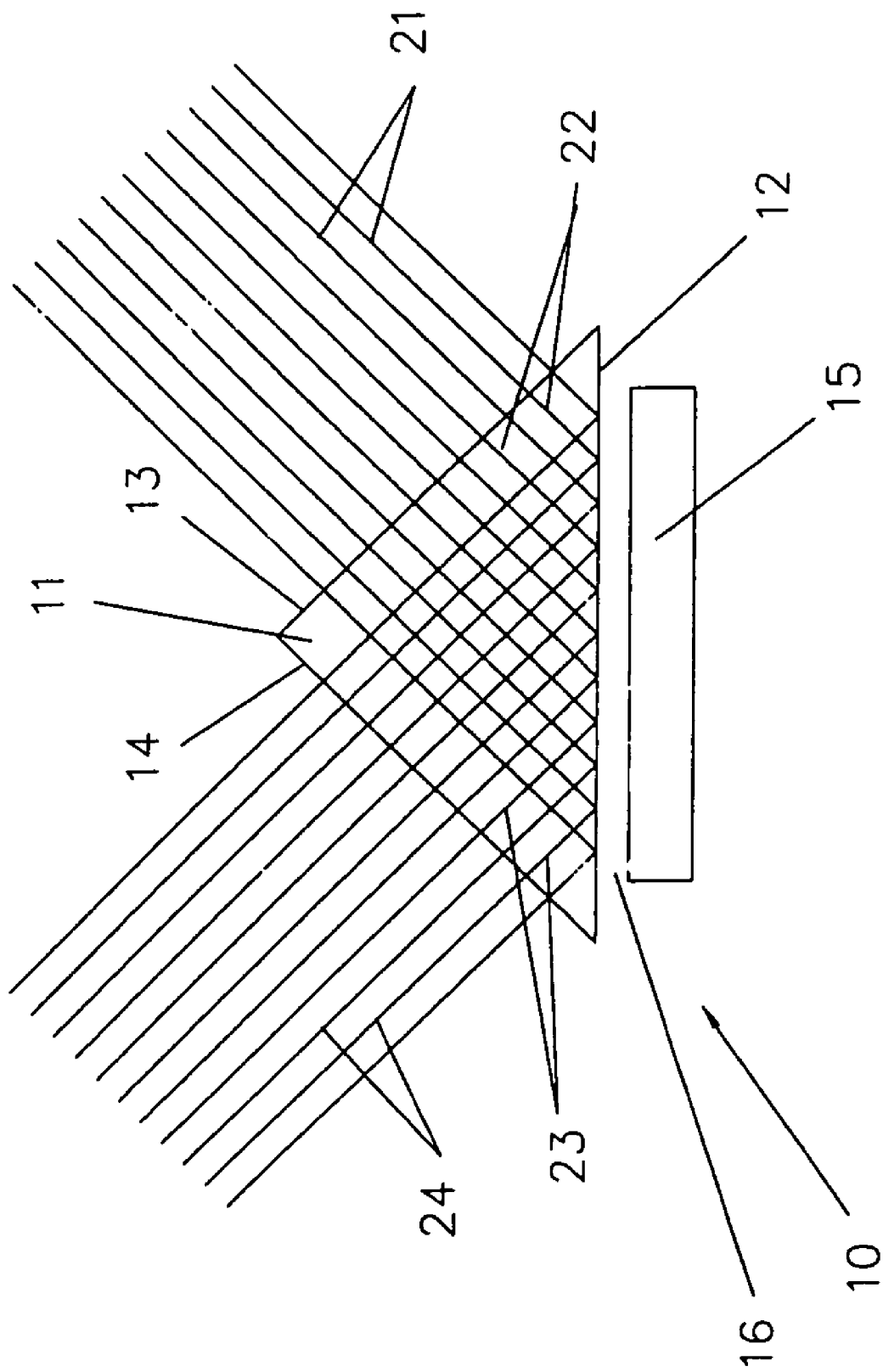
FIG. 2 shows a front view of a ray trace of light traveling through the light valve with the valve in the first position.

Referring now to FIG. 2, a front view of the light valve 10 of the present invention, exterior light rays 21 are shown as they are directed to the prism 11. The light 21 hits the input surface 13 at an angle normal to the surface 13. The incidence angle of the light 21 could be other than normal, but for purposes of this disclosure, a normal contact angle will be described. The rays 21 pass through the prism's input surface 13. The interior rays 22 maintain the same normal relationship to the input surface 13 of the prism 11 as the exterior light rays 21. (If the angle of incidence of the exterior light rays 21 were other than normal, the light 21 would be refracted and the interior angle would not be the same as the exterior angle.) The interior rays 22 hit the hypotenuse 12 side of the prism 11. The difference of the angle that the interior rays 22 hit the hypotenuse 12 from normal is the same angle as the input surface relative to the hypotenuse 12. The prism 11 used in this instance is a 45° prism, so the interior light 22 hits the hypotenuse 12 at 45° from normal. While in the preferred embodiment, the angle of the prism 11 is chosen to be 45°, other prism angles could also be used.

When the index of refraction of the prism material is much greater than that of the exterior region, light reflects off the hypotenuse 12. In the case of the light switch 10 of the present invention, the exterior region is chosen to be air or a vacuum in order to provide a low index of refraction. It should be noted that other exterior materials could be used that have an optical index less than that of the prism. The equation that determines the angle of internal reflection, which is defined herein as total internal reflection (TIR), is determined by:

$$\text{TIR angle} = \arcsin(\text{index of refraction exterior}/\text{index of refraction prism}).$$

The internal reflections 23 off the hypotenuse 12 reflect at the same angle that they hit the surface. The light passes through the output optical surface 14. The output light rays 24 are then directed into the rest of the optical system. In the case of a projection system, the remainder of the system would include lenses and a screen. In the case of a telecommunications system, the system would most likely include a fiber optic cable or a detector.

The use of a prism is a common means to bend light at right angles and is used in thousands of different types of equipment and products. There are many different types of angled surfaces that can create internal reflections on at least one of the surfaces. People knowledgeable in the art of optics could conceive of thousands of different ways to create a total internally reflecting (TIR) surface. Using a prism is the most common method.

The switch element 15 is located below the hypotenuse 12. The switch element 15 is shown to be positioned close to the hypotenuse surface 12. The gap 16 between the switch element 15 and the hypotenuse surface 12 needs to be only approximately the length of the maximum wavelength of the system in which the valve 10 is being used. In the case of a blue light system, the gap 16 would be on the order of 500 nanometers. For a white light system, the gap 16 would be around 700 nanometers. For tolerance reasons, the gap 16 might actually be nominally spaced at 1500 nanometers. The system need only have an extremely small gap 16 for the light 22 to TIR off the surface of the prism 12. FIG. 2 is not to scale.

Figure 3:
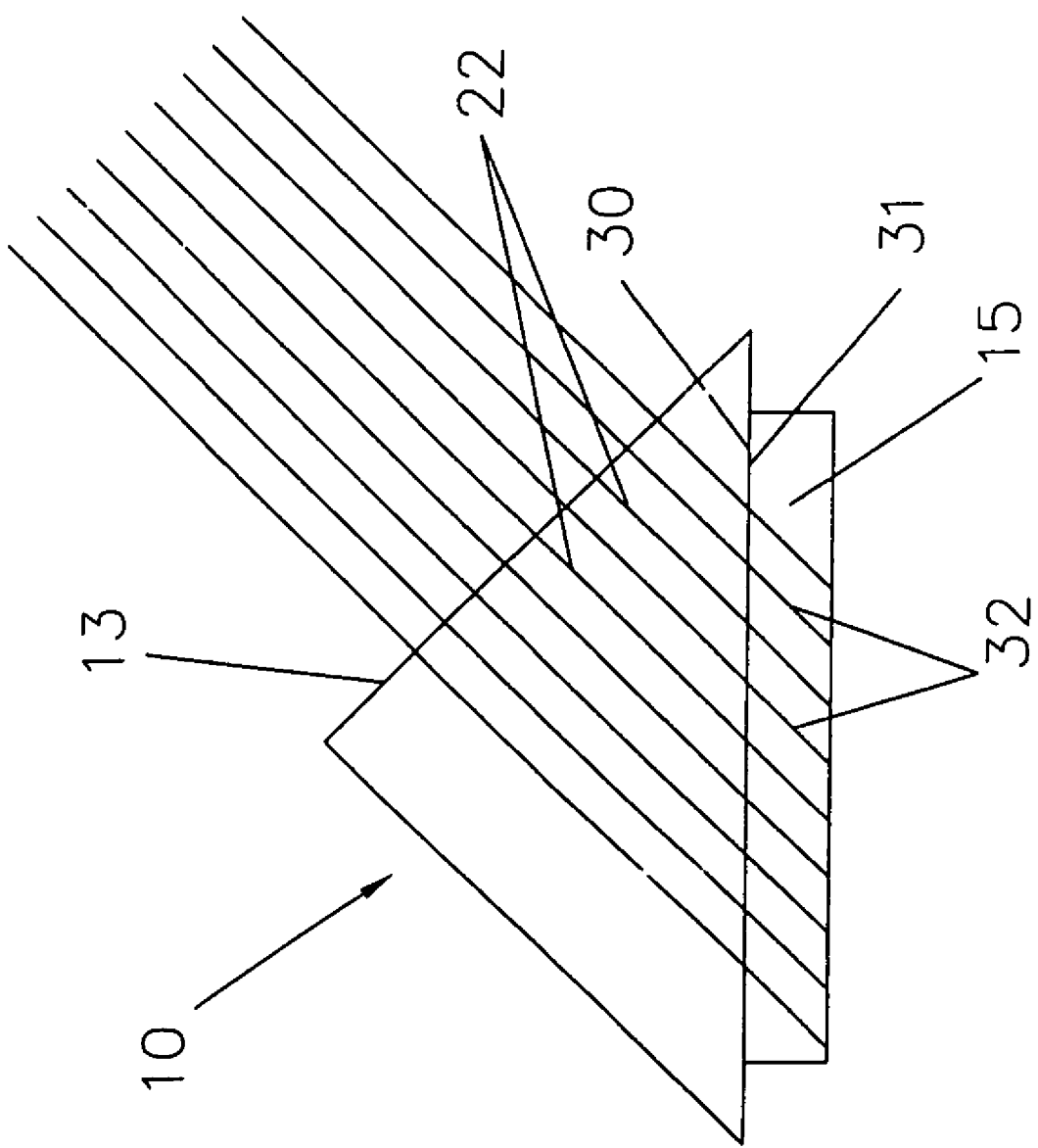
FIG. 3 shows a front view of a ray trace of light traveling through the light valve with the valve in the second position.
Figure 4:
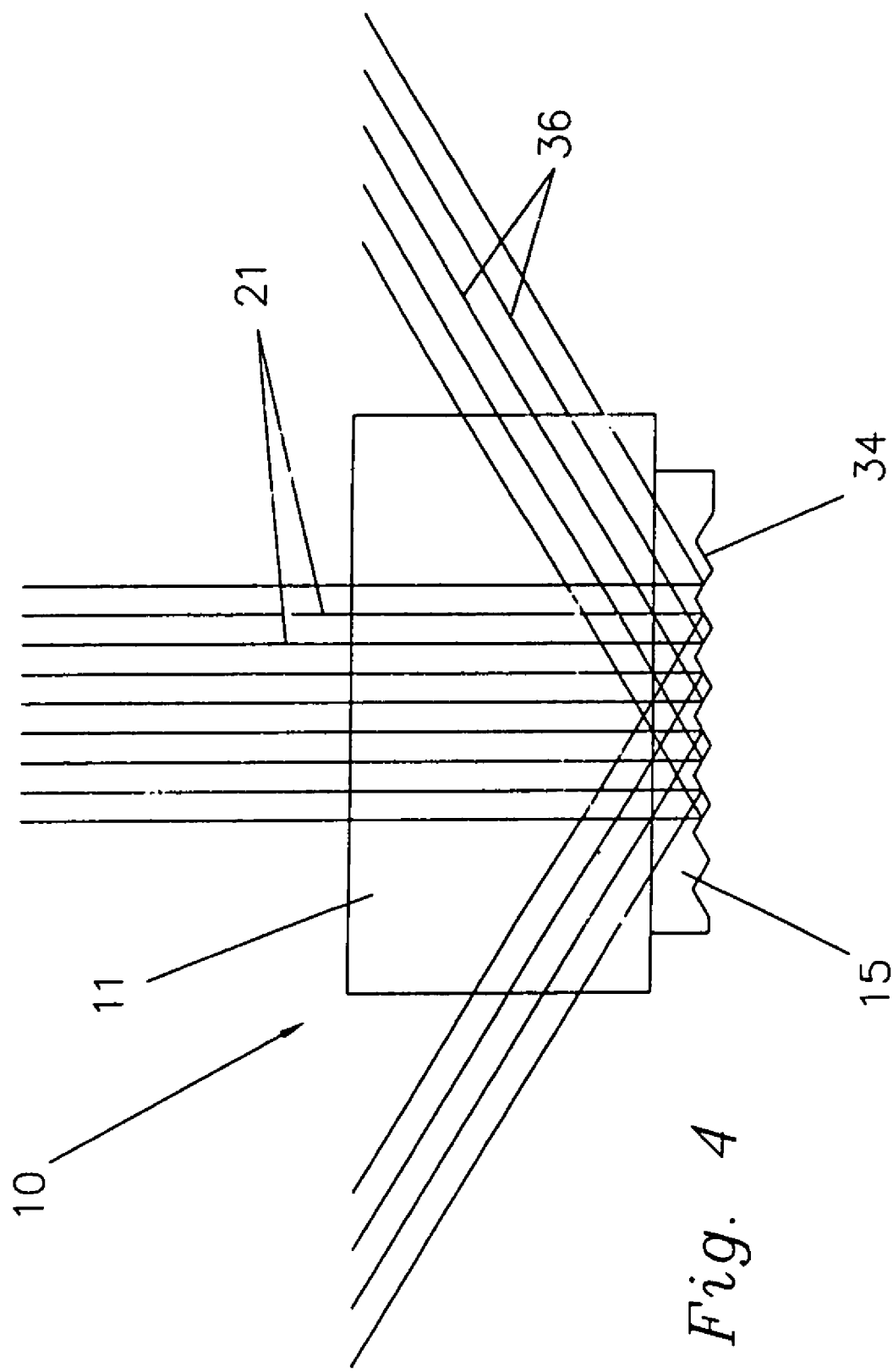
FIG. 4 shows a right side view of a ray trace of the light traveling through the light valve with the valve in the second position.

When the gap 16 is made much smaller than the minimum operating wavelength, (as shown in FIGS. 3 and 4), the light 22 no longer reflects off of the prism's internal hypotenuse surface 30. Instead the light 22 passes through the first surface 31 of the switch element 15. If the index of refraction is the same for both the prism 11 and the switch element 15, the light continues in the same direction as interior rays 22. If the indexes of refraction are different, the light 22 refracts off the first surface 31 in a non-parallel direction.

To ensure the gap 16 between the switch element 15 and the hypotenuse surface 12 is sufficiently narrow, a thin layer of a transparent elastic material is coated onto either the hypotenuse surface 12 or the first surface 31 of the switch element 15.

Referring to FIG. 4, a right side view, the switched light contacts a serrated second surface 34 of the switch element 15. The serrations of the second surface 34 are at an angle to the incoming light. The light reflects off these serrated surfaces 34 and is directed towards the front and/or the back of the valve 10 as off light 36. By being reflected to the front and/or back, the light no longer travels through the output optical surface 14 of the prism 11, and therefore the switch 15 of the valve 10 is in the second position. The angles of the serrations on the second surface 34 of the switch element 15 need only be large enough to prevent the light from passing through the output section 14 of the prism 11. The angles of the serrations can be very shallow.

Figure 5:
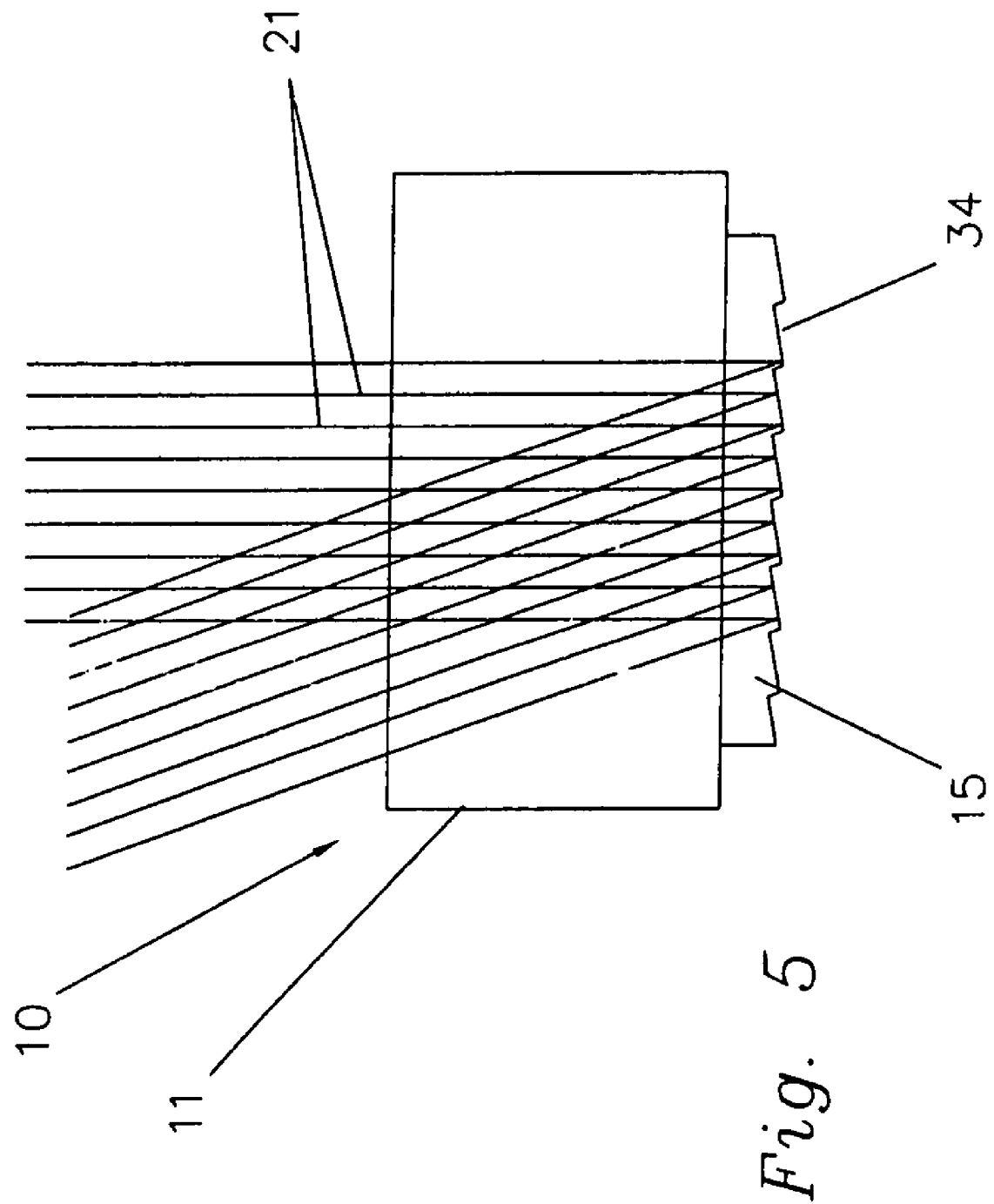
FIG. 5 shows a right side view of a ray trace of the light traveling through a modified second surface of the light switch.

FIG. 5 shows a serrated second surface 34 where very shallow angles are used to direct the light to an off center location on the prism 11. This allows the light to be switched to a different path than when the light reflects off of the hypotenuse of the prism. This would be useful in a telecommunications application.

Figure 6:
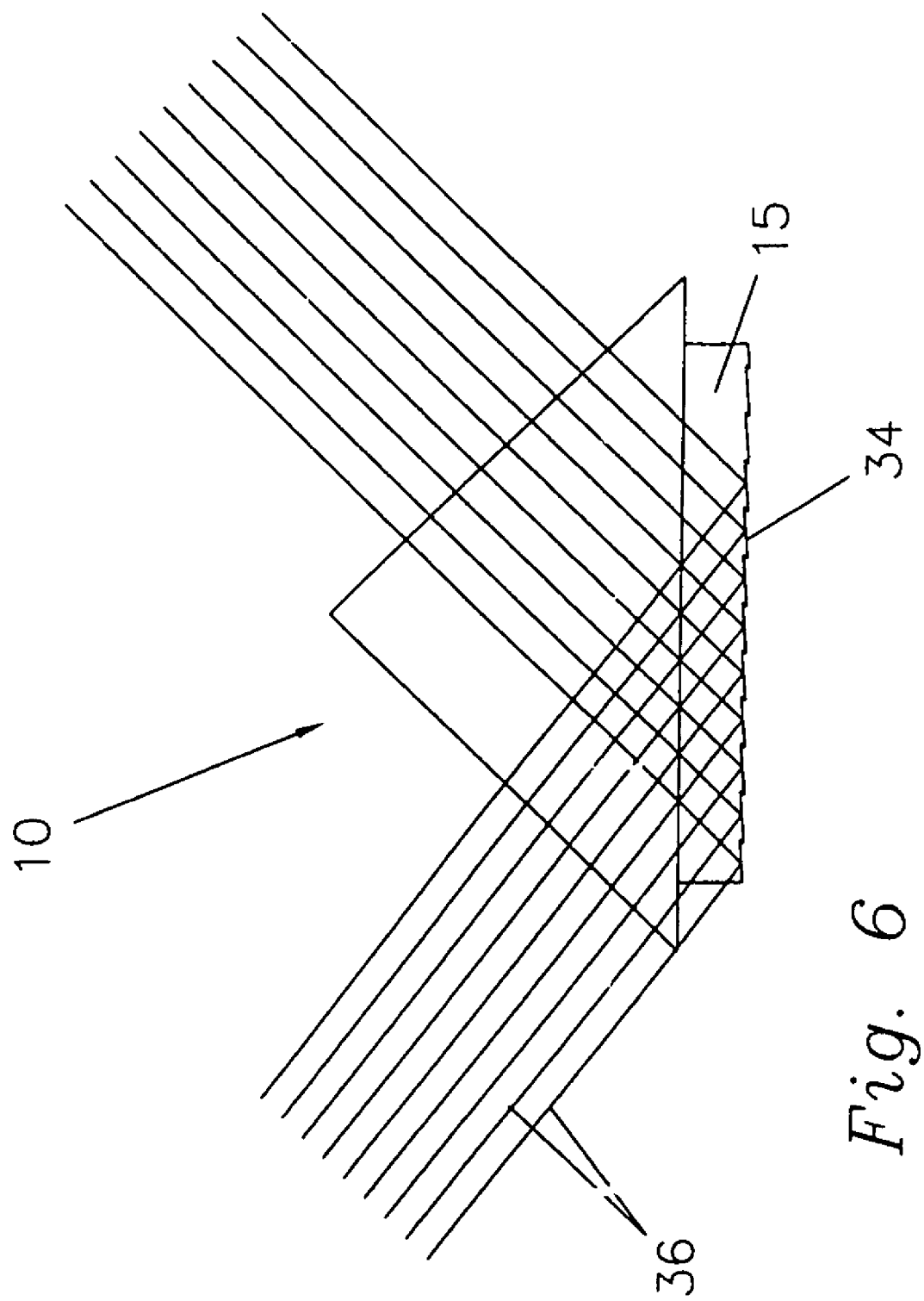
FIG. 6 shows a front view of a ray trace of the light traveling through another modified second surface.

Another conformation that switches the light to a different direction is shown in FIG. 6, a front side view. The second surface 34 has angled surfaces in a direction orthogonal to those of the second surface 34 displayed in FIG. 5.

Figure 7:
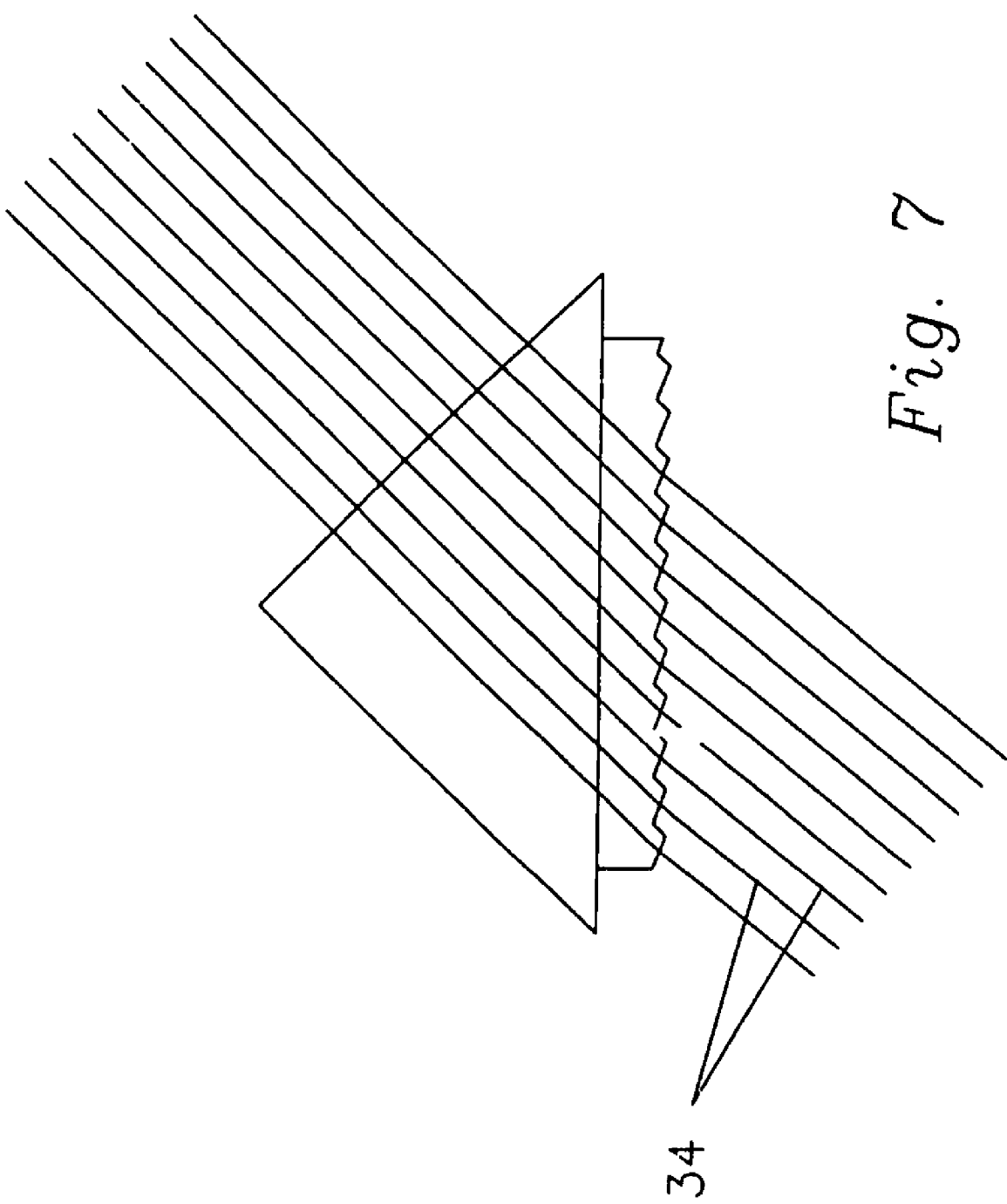
FIG. 7 shows a front view of a ray trace of light traveling through another modified second surface.

FIG. 7 shows a similarly angled serrated second surface 34 where the surface refracts the light rather than producing total internal reflection. The configuration illustrated in FIG. 7 directs the light to an alternate direction.

In addition to the conformations described above, there are at least three alternate methods that can be employed to stop the light from total internal reflecting off the second surface 34 of the switch element 15. The first of the alternate methods is to absorb the light in the switch element 15. This method would not work well in anything but applications involving low power levels. The second alternate method would be to diffuse the light as it propagates through the switch element 15. By diffusing the light, only a very small portion would find its way to the exit surface 14 of the prism 11 and then through the rest of the optical system. The third alternate method is to build the second surface 34 with a diffuse topography. With a diffuse topography, the second surface 34 would allow only a small portion of the light to be transmitted through the output side 14 of the prism 11.

Figure 8:
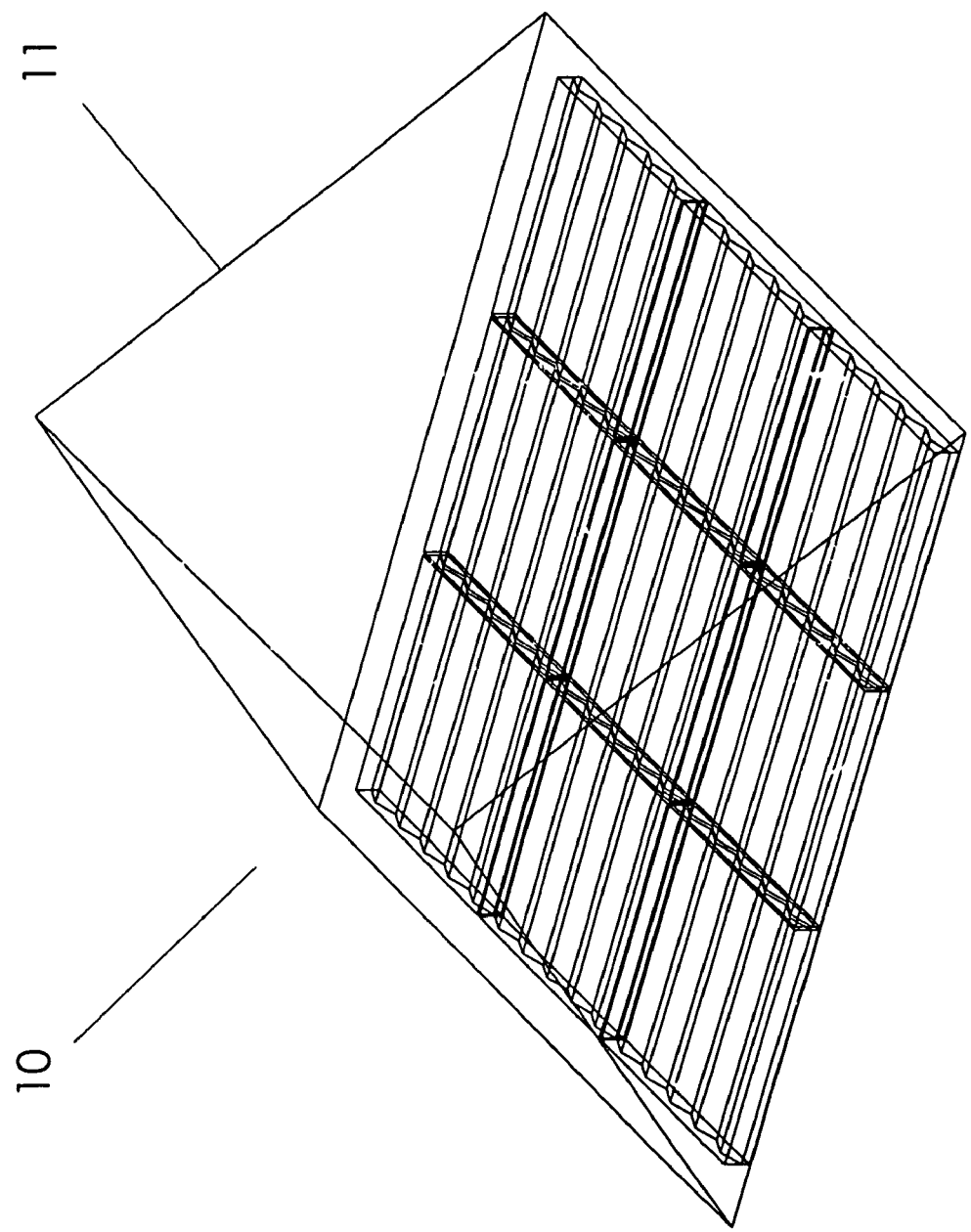
FIG. 8 is a perspective view of a three-by-three array of light valves.

FIG. 8 shows an array of nine switch elements under one prism. In a projection system application, there might be over a million of these switches in an area of around 8 mm×10 mm. The individual switches are extremely small. The light valves 10 of the present invention are around 30 microns square.

Figure 9:
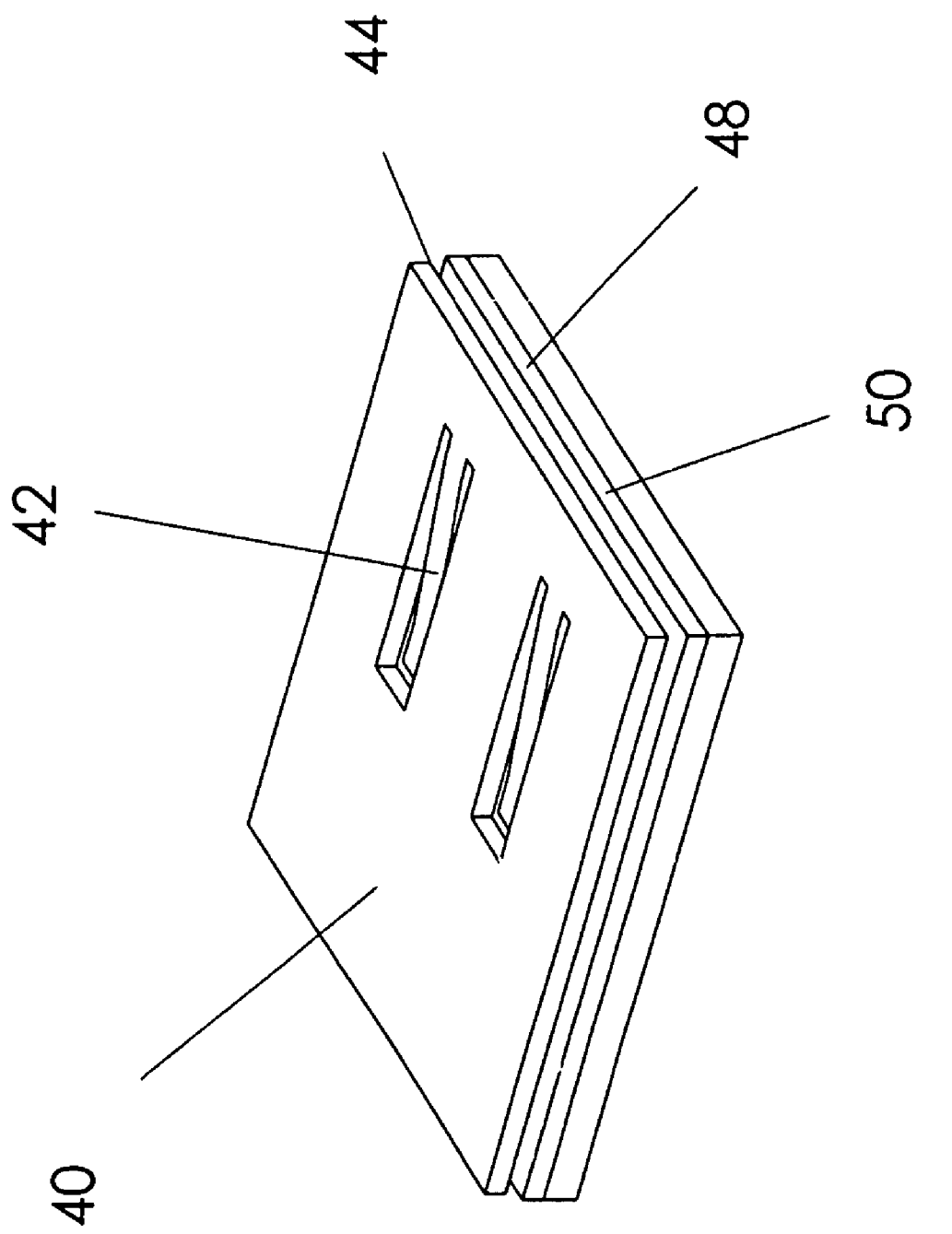
FIG. 9 is a perspective view of the actuating mechanism for the light valve.

As mentioned above, the diffusion elements need to move only a small distance to switch states of the light internal reflection. One such structure to achieve this effect is shown in FIG. 9. The prism and switch elements are not shown in this figure for clarity. A first conductive layer 40 is shown on top. The first conductive layer 40 supports and locates the switch element 15 (not shown in FIG. 9). At least one spring element 42 is located on the first conductive layer 40. In the preferred embodiment, two springs 42 are utilized. A first end of the spring element 42 is attached to the first conductive layer 40, and a second end of the spring element 42 is attached to a base 44. The springs 42 serve two purposes-to locate the first conductive layer 40 in the horizontal plane, and to provide an upward force to keep the switch 15 in contact with the prism 11 when the switch is in the second (off) position.

Figure 10:
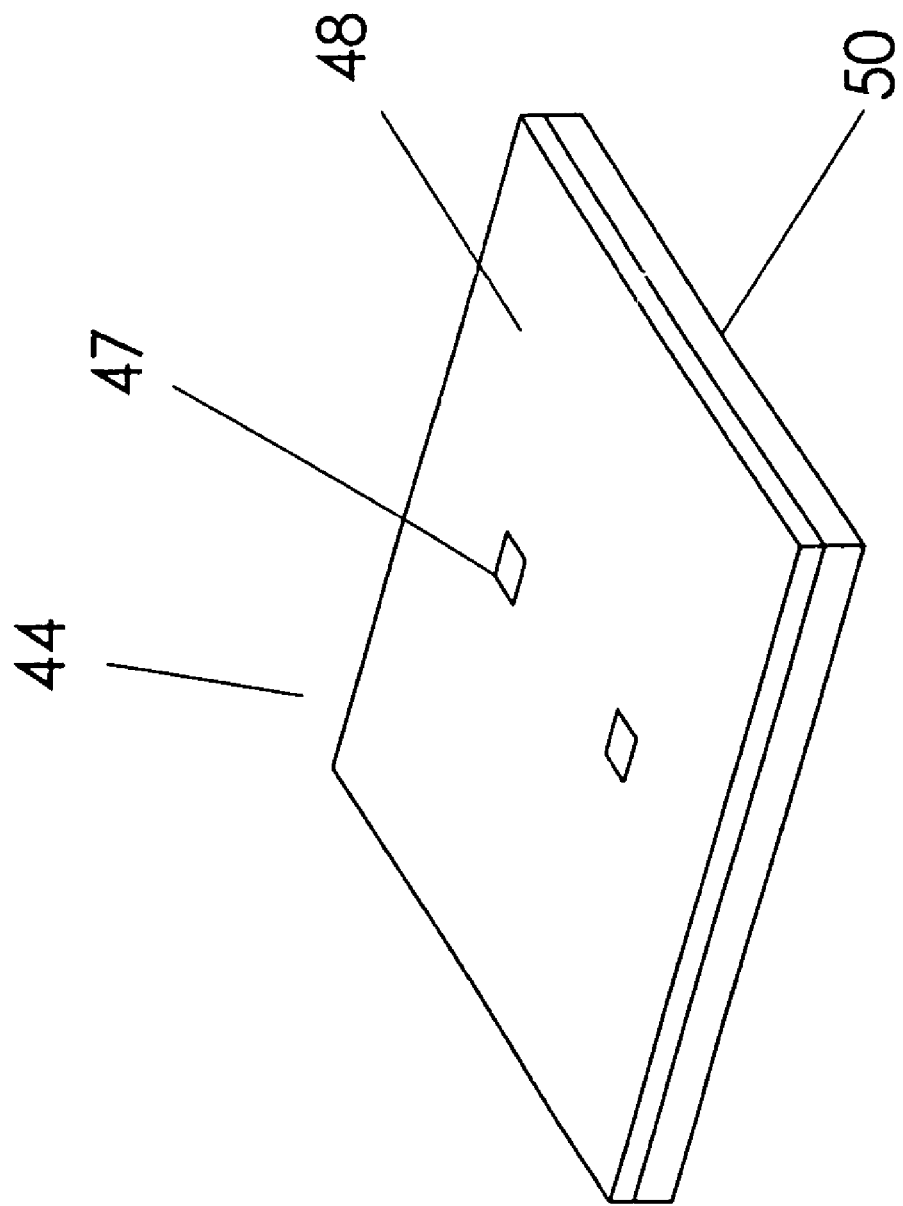
FIG. 10 is a perspective view of the base of the actuating mechanism.

FIG. 10 is a view of the base 44 with the first conductive layer 40 and the springs 42 removed. Base posts 47 serve as the attachment points for the springs 42. The base posts 47 and the springs 42 are mechanically and electrically connected to the first conductive layer 40. The electrical connection allows a charge to be placed on these elements. The base posts 47 and the springs 42 are mechanically connected to the first conductive layer 40 so they mechanically align the switch element 15 with the prism 11 and keep the switch element 15 in contact with the prism 11 in the second position.

The base posts 47 are surrounded by an insulating layer 48. Under the insulating layer 48 is a second conductive layer 50. The second conductive layer 50 is not electrically connected to the first conductive layer 40; however, the second conductive layer 50 is mechanically joined to the first conductive layer 40.

By applying either opposite charges or by applying no charge to the two conductive layers 40, 50, a force is created to draw the conductive layers 40, 50 together. When opposite charges are applied to the conductive layers 40, 50, the switch element 15 is moved away from the prism 11, which causes the light valve 10 to be in the first (on) state.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim

1. A light valve device comprising:
   an array of light valves, at least one of the light valves including:
   a light bending mechanism having an index of refraction greater than an index of refraction of an area adjacent to the light bending mechanism, so that light projected onto a first surface of the light bending mechanism is reflected off a second surface of the light bending mechanism;
   a switch element including at least one serrated reflecting surface; and
   a moving mechanism to move the at least one serrated reflecting surface of the switch element relative to the second surface of the light bending mechanism,
   wherein when the switch element is in a first position, light passing through the first surface of the light bending mechanism reflects off of the second surface of the light bending mechanism and passes through an output surface of the light bending mechanism, and
   when the switch element is in a second position, the at least one serrated reflecting surface is moved to a position touching or in close proximity to the second surface of the light bending mechanism, so that light passing through the first surface of the light bending mechanism is not reflected off the second surface, but rather continues on to the at least one serrated reflecting surface of the switch element, the at least one serrated reflecting surface reflecting the light.

2. The light valve of claim 1, wherein light is absorbed by at least one switch element when the switch element is in the second position.

3. The light valve of claim 1, wherein at least one switch element diffuses light when the switch element is in the second position.

4. The light valve of claim 1, wherein at least one switch element has a diffuse topography so that light is not reflected to the output surface of the light bending mechanism.

5. The light valve of claim 1, wherein the light bending mechanism is a prism.

6. The light valve of claim 1, wherein at least one surface of at least one light bending mechanism is coated with an elastic material to ensure that a gap between the light bending mechanism and the switch element is sufficiently narrow.

7. The light valve of claim 1, wherein at least one surface of at least one switch element is coated with an elastic material to ensure that a gap between the light bending mechanism and the switch element is sufficiently narrow.

8. The light valve of claim 1, wherein an electrostatic force is used to move at least one switch element between the first position and the second position.

9. The light valve of claim 1, wherein a spring force is used to move at least one switch element between the first position and the second position.

10. A light valve device comprising:
    an array of light valves, at least one of the light valves including:
    a light bending mechanism having an index of refraction greater than an index of refraction of an area adjacent to the light bending mechanism, so that light projected onto a first surface of the light bending mechanism is reflected off a second surface of the light bending mechanism;

a switch element including a reflecting surface; and a moving mechanism to move the reflecting surface of the switch element relative to the second surface of the light bending mechanism, wherein when the switch element is in a first position, light passing through the first surface of the light bending mechanism reflects off of the second surface of the light bending mechanism and passes through an output surface of the light bending mechanism, and when the switch element is in a second position, the reflecting surface is moved to a position touching or in close proximity to the second surface of the light bending mechanism, so that light passing through the first surface of the light bending mechanism is not reflected off the second surface, but rather continues on to a surface of the switch element, and light is absorbed by the switch element.

11. The light valve of claim 10, wherein at least one switch element diffuses light when the at least one switch element is in the second position.

12. The light valve of claim 10, wherein at least one switch element has a diffuse topography so that light is not reflected to the output surface of the light bending mechanism.

13. The light valve of claim 10, wherein the light bending mechanism is a prism.

14. The light valve of claim 10, wherein at least one surface of at least one light bending mechanism is coated with an elastic material to ensure that a gap between the at least one light bending mechanism and the at least one switch element is sufficiently narrow.

15. The light valve of claim 10, wherein at least one surface of at least one switch element is coated with an elastic material to ensure that a gap between the light bending mechanism and the at least one switch element is sufficiently narrow.

16. The light valve of claim 10, wherein an electrostatic force is used to move at least one switch element between the first position and the second position.

17. The light valve of claim 10, wherein a spring force is used to move at least one switch element between the first position and the second position.

18. A light valve device comprising:

an array of light valves, at least one of the light valves including:

a light bending mechanism having an index of refraction greater than an index of refraction of an area adjacent to the light bending mechanism, so that light projected onto a first surface of the light bending mechanism is reflected off a second surface of the light bending mechanism;

a switch element including a reflecting surface; and a moving mechanism to move the reflecting surface of the switch element relative to the second surface of the light bending mechanism, wherein when the switch element is in a first position, light passing through the first surface of the light bending mechanism reflects off of the second surface of the light bending mechanism and passes through an output surface of the light bending mechanism, and when the switch element is in a second position, the reflecting surface is moved to a position touching or in close proximity to the second surface of the light bending mechanism, so that light passing through the first surface of the light bending mechanism is not reflected off the second surface, but rather continues on to a surface of the switch element, the switch element diffusing light.

19. The light valve of claim 18, wherein at least one switch element has a diffuse topography so that light is not reflected to the output surface of the light bending mechanism.

20. The light valve of claim 18, wherein the light bending mechanism is a prism.

21. The light valve of claim 18, wherein at least one surface of at least one light bending mechanism is coated with an elastic material to ensure that a gap between the at least one light bending mechanism and the switch element is sufficiently narrow.

22. The light valve of claim 18, wherein at least one surface of at least one switch element is coated with an elastic material to ensure that a gap between the light bending mechanism and the at least one switch element is sufficiently narrow.

23. The light valve of claim 18, wherein an electrostatic force is used to move at least one switch element between the first position and the second position.

24. The light valve of claim 18, wherein a spring force is used to move at least one switch element between the first position and the second position.

25. A light valve device comprising:

an array of light valves, at least one of the light valves including:

a light bending mechanism having an index of refraction greater than an index of refraction of an area adjacent to the light bending mechanism, so that light projected onto a first surface of the light bending mechanism is reflected off a second surface of the light bending mechanism;

a switch element including a reflecting surface; and a moving mechanism to move the reflecting surface of the switch element relative to the second surface of the light bending mechanism, wherein at least one switch element has a diffuse topography so that no light is reflected to the output surface of the light bending mechanism, wherein when the at least one switch element is in a first position, light passing through the first surface of the light bending mechanism reflects off of the second surface of the light bending mechanism and passes through an output surface of the light bending mechanism, and when the at least one switch element is in a second position, the reflecting surface is moved to a position touching or in close proximity to the second surface of the light bending mechanism, so that light passing through the first surface of the light bending mechanism is not reflected off the second surface, but rather continues on to a surface of the at least one switch element.

26. The light valve of claim 25, wherein the light bending mechanism is a prism.

27. The light valve of claim 25, wherein at least one surface of at least one light bending mechanism is coated with an elastic material to ensure that a gap between the at least one light bending mechanism and the switch element is sufficiently narrow.

28. The light valve of claim 25, wherein at least one surface of at least one switch element is coated with an elastic material to ensure that a gap between the light bending mechanism and the at least one switch element is sufficiently narrow.

29. The light valve of claim 25, wherein an electrostatic force is used to move at least one switch element between the first position and the second position.

30. The light valve of claim 25, wherein a spring force is used to move at least one switch element between the first position and the second position.

31. A light valve device comprising:
    an array of light valves, at least one of the light valves including:
    a light bending mechanism having an index of refraction greater than an index of refraction of an area adjacent to the light bending mechanism, so that light projected onto a first surface of the light bending mechanism is reflected off a second surface of the light bending mechanism;
    a switch element including a reflecting surface; and
    a moving mechanism to move the reflecting surface of the switch element relative to the second surface of the light bending mechanism,
        wherein at least one surface of at least one light bending mechanism is coated with an elastic material to ensure that a gap between the at least one light bending mechanism and the switch element is sufficiently narrow,
        wherein when the switch element is in a first position, light passing through the first surface of the light bending mechanism reflects off of the second surface of the light bending mechanism and passes through an output surface of the light bending mechanism, and
        when the switch element is in a second position, the reflecting surface is moved to a position touching or in close proximity to the second surface of the light bending mechanism, so that light passing through the first surface of the light bending mechanism is not reflected off the second surface, but rather continues on to a surface of the switch element.

32. The light valve of claim 31, wherein the light bending mechanism is a prism.

33. The light valve of claim 31, wherein at least one surface of at least one switch element is coated with an elastic material to ensure that a gap between the light bending mechanism and the at least one switch element is sufficiently narrow.

34. The light valve of claim 31, wherein an electrostatic force is used to move at least one switch element between the first position and the second position.

35. The light valve of claim 31, wherein a spring force is used to move at least one switch element between the first position and the second position.

36. A light valve device comprising:
    an array of light valves, at least one of the light valves including:
    a light bending mechanism having an index of refraction greater than an index of refraction of an area adjacent to the light bending mechanism, so that light projected onto a first surface of the light bending mechanism is reflected off a second surface of the light bending mechanism;
    a switch element including a reflecting surface; and
    a moving mechanism to move the reflecting surface of the switch element relative to the second surface of the light bending mechanism,
        wherein at least one surface of at least one switch element is coated with an elastic material to ensure that a gap between the light bending mechanism and the at least one switch element is sufficiently narrow,
        wherein when the at least one switch element is in a first position, light passing through the first surface of the light bending mechanism reflects off of the second surface of the light bending mechanism and passes through an output surface of the light bending mechanism, and
        when the at least one switch element is in a second position, the reflecting surface is moved to a position touching or in close proximity to the second surface of the light bending mechanism, so that light passing through the first surface of the light bending mechanism is not reflected off the second surface, but rather continues on to a surface of the at least one switch element.

37. The light valve of claim 36, wherein the light bending mechanism is a prism.

38. The light valve of claim 36, wherein an electrostatic force is used to move at least one switch element between the first position and the second position.

39. The light valve of claim 36, wherein a spring force is used to move at least one switch element between the first position and the second position.

* * * * *